(12) United States Patent
Mao et al.

(10) Patent No.: US 10,869,048 B2
(45) Date of Patent: Dec. 15, 2020

(54) METHOD, DEVICE AND SYSTEM FOR TRANSMITTING AND RECEIVING PICTURES USING A HYBRID RESOLUTION ENCODING FRAMEWORK

(71) Applicant: Tencent Technology (Shenzhen) Company Limited, Shenzhen (CN)

(72) Inventors: Xunan Mao, Shenzhen (CN); Xinwei Gao, Shenzhen (CN); Tao Zhang, Shenzhen (CN); Licai Guo, Shenzhen (CN); Yongfang Shi, Shenzhen (CN); Anlin Gao, Shenzhen (CN); Haibo Deng, Shenzhen (CN); Yaoyao Guo, Shenzhen (CN); Chenchen Gu, Shenzhen (CN); Jian He, Shenzhen (CN); Jing Lv, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/546,034

(22) Filed: Aug. 20, 2019

(65) Prior Publication Data

US 2019/0394476 A1    Dec. 26, 2019

Related U.S. Application Data

(63) Continuation of application No. PCT/CN2018/086510, filed on May 11, 2018.

(30) Foreign Application Priority Data

Jun. 28, 2017   (CN) .......................... 2017 1 0508345

(51) Int. Cl.
*H04N 19/34*    (2014.01)
*H04N 19/124*   (2014.01)
(Continued)

(52) U.S. Cl.
CPC .......... *H04N 19/34* (2014.11); *H04N 19/124* (2014.11); *H04N 19/132* (2014.11);
(Continued)

(58) Field of Classification Search
None
See application file for complete search history.

(56) References Cited

U.S. PATENT DOCUMENTS 5,805,222 A * 9/1998 Nakagawa ........... H04N 19/172
                                          375/240.03
9,615,098 B1 * 4/2017 Yi ........................ H04N 19/179
(Continued)

FOREIGN PATENT DOCUMENTS

CN      102769747 A    11/2012
CN      105830448 A     8/2016
WO   WO 2014028404 A1   2/2014

OTHER PUBLICATIONS

Tencent Technology, ISRWO, PCT/CN2018/086510, dated Aug. 1, 2018, 6 pgs.
(Continued)

*Primary Examiner* — Tyler W. Sullivan
(74) *Attorney, Agent, or Firm* — Morgan, Lewis & Bockius LLP (57) ABSTRACT

Embodiments of this application disclose a picture transmission method performed at a computer device. After obtaining a picture, the computer device generates a video sequence by replicating the picture N times, and N being a positive integer. Next the computer device obtains a resolution setting sequence and encodes the N to-be-encoded pictures in the video sequence according to the resolution setting sequence to generate N encoded pictures, each encoded picture having an associated resolution setting. Finally, the computer device sends the N encoded pictures to a decoding computer device. The decoding computer device
(Continued)

then decodes and displays the N encoded pictures according to their respective resolution settings from low to high.

15 Claims, 8 Drawing Sheets

(51) Int. Cl.
    *H04N 19/132*     (2014.01)
    *H04N 19/136*     (2014.01)
    *H04N 19/172*     (2014.01)
    *H04N 19/33*     (2014.01)
    *H04N 19/30*     (2014.01)

(52) U.S. Cl.
    CPC ......... *H04N 19/136* (2014.11); *H04N 19/172* (2014.11); *H04N 19/33* (2014.11); *H04N 19/395* (2014.11)

(56) References Cited

U.S. PATENT DOCUMENTS

| | | | |
|---|---|---|---|
| 10,397,574 B2* | 8/2019 | Zhang | H04N 19/14 |
| 10,462,483 B1* | 10/2019 | Xu | H04N 19/176 |
| 10,701,394 B1* | 6/2020 | Caballero | H04N 19/33 |
| 2005/0169545 A1* | 8/2005 | Ratakonda | H04N 19/142 |
| | | | 382/238 |
| 2007/0058724 A1* | 3/2007 | Paul | H04N 19/147 |
| | | | 375/240.21 |
| 2009/0279605 A1* | 11/2009 | Holcomb | H04N 19/147 |
| | | | 375/240.03 |
| 2013/0094565 A1* | 4/2013 | Yang | H04N 19/152 |
| | | | 375/240.02 |
| 2014/0015922 A1* | 1/2014 | Zhang | H04N 19/513 |
| | | | 348/43 |
| 2014/0161174 A1* | 6/2014 | Mohsenian | H04N 19/40 |
| | | | 375/240.02 |
| 2017/0094311 A1* | 3/2017 | Chou | H04N 19/186 |
| 2017/0208328 A1* | 7/2017 | Kuusela | H04N 19/124 |
| 2020/0021841 A1* | 1/2020 | Leontaris | H04N 19/196 |
| 2020/0053356 A1* | 2/2020 | Mao | H04N 19/132 |

OTHER PUBLICATIONS

Tencent Technology, IPRP, PCT/CN2018/086510, dated Dec. 31, 2019, 5 pgs.

* cited by examiner

METHOD, DEVICE AND SYSTEM FOR TRANSMITTING AND RECEIVING PICTURES USING A HYBRID RESOLUTION ENCODING FRAMEWORK

CROSS-REFERENCE TO RELATED APPLICATIONS

This application is a continuation application of PCT/CN2018/086510, entitled "PICTURE TRANSMISSION METHOD AND APPARATUS, PICTURE RECEIVING METHOD AND APPARATUS, AND SYSTEM THEREOF" filed on May 11, 2018, which claims priority to Chinese Patent Application No. 201710508345.1, entitled "PICTURE TRANSMISSION METHOD AND APPARATUS, PICTURE RECEIVING METHOD AND APPARATUS, AND SYSTEM THEREOF" filed with the Chinese Patent Office on Jun. 28, 2017, both of which are incorporated herein by reference in their entirety.

FIELD OF THE TECHNOLOGY

Embodiments of this application relate to the field of picture processing technologies, and in particular, to a picture transmission method and apparatus, a picture receiving method and apparatus, and a system thereof.

BACKGROUND OF THE DISCLOSURE

Currently, pictures are widely used as a carrier carrying information. Especially, within the rise of social networking software such as WeChat™ and QQ™ (both are trademarks owned by Tencent Holdings, Ltd.), users more frequently communicate by using pictures. In a related technology, pictures are loaded according to original sizes of the pictures. For example, a size of an original picture is 4 Megabits (4M), and thus, a corresponding loading resource (such as a network transmission resource and a memory resource) is occupied, and a picture with a size of 4M is loaded.

SUMMARY

Embodiments of this application provide a picture transmission method and apparatus, a picture receiving method and apparatus, and a system thereof, to resolve a technical problem in the related technology that in a manner of transmitting a picture based on a size of the picture, when the picture is excessively large or a network speed is excessively slow, the picture has a problem such as transmission delay, and consequently, a user cannot view the related picture in real time.

An embodiment of this application provides a picture transmission method, applied to a computer device and including the following steps:

obtaining a picture;

generating a video sequence according to the picture, the video sequence comprising N to-be-encoded pictures generated by replicating the picture N times, and N being a positive integer;

obtaining a resolution setting sequence, the resolution setting sequence comprising resolutions corresponding to the N to-be-encoded pictures; and encoding the N to-be-encoded pictures in the video sequence according to the resolution setting sequence to generate N encoded pictures, each encoded picture having an associated resolution setting, and sending the N encoded pictures to a decoding terminal, so that the decoding terminal decodes and displays the N encoded pictures according to their respective resolution settings from low to high.

An embodiment of this application provides a picture receiving method, applied to a computer device and including:

receiving N encoded pictures, the N encoded pictures being generated by encoding N pictures generated by copying a picture;

decoding an $i^{th}$ encoded picture to generate an $i^{th}$ decoded picture, and presenting the $i^{th}$ decoded picture to a user, i being a positive integer less than N; and decoding an $(i+1)^{th}$ encoded picture according to the $i^{th}$ decoded picture to generate an $(i+1)^{th}$ decoded picture, replacing the $i^{th}$ decoded picture with the $(i+1)^{th}$ decoded picture, and presenting the $(i+1)^{th}$ decoded picture to the user.

An embodiment of this application provides a picture transmission apparatus, including:

a processor and a memory connected to the processor, the memory storing machine-readable instructions executable to the processor, and the processor executing the machine-readable instructions to perform the following operations:

obtaining a picture;

generating a video sequence according to the picture, the video sequence comprising N to-be-encoded pictures generated by replicating the picture N times, and N being a positive integer;

obtaining a resolution setting sequence, the resolution setting sequence comprising resolutions corresponding to the N to-be-encoded pictures; and encoding the N to-be-encoded pictures in the video sequence according to the resolution setting sequence to generate N encoded pictures each encoded picture having an associated resolution setting; and sending the N encoded pictures to a decoding terminal, so that the decoding terminal decodes and displays the N encoded pictures according to their respective resolution settings from low to high.

An embodiment of this application provides a picture receiving apparatus, including:

a processor and a memory connected to the processor, the memory storing machine-readable instructions executable to the processor, and the processor executing the machine-readable instructions to perform the following operations:

receiving N encoded pictures, the N encoded pictures being generated by encoding N pictures generated by copying a picture;

decoding an $i^{th}$ encoded picture to generate an $i^{th}$ decoded picture;

presenting the $i^{th}$ decoded picture to a user, i being a positive integer less than N; and decoding an $(i+1)^{th}$ encoded picture according to the $i^{th}$ decoded picture to generate an $(i+1)^{th}$ decoded picture, replacing the $i^{th}$ decoded picture with the $(i+1)^{th}$ decoded picture, and presenting the $(i+1)^{th}$ decoded picture to the user.

An embodiment of this application provides a picture processing system, including: the picture transmission apparatus and the picture receiving apparatus in the foregoing embodiments of this application.

An embodiment of this application provides a non-temporary computer-readable storage medium, storing a computer program thereon, and the program implementing the picture transmission method and the picture receiving method in the foregoing embodiments of this application.

BRIEF DESCRIPTION OF THE DRAWINGS

The foregoing and/or additional aspects and advantages of the embodiments of this application will become more obvious and easier to understand from the following descriptions of the embodiments with reference to the accompanying drawings.

DESCRIPTION OF EMBODIMENTS

The embodiments of this application are described in detail below. Examples of the embodiments are shown in the accompanying drawings, and the same or similar symbols throughout represent the same or similar components or components having the same or similar functions. The following embodiments described with reference to the accompanying drawings are exemplary, and aim at explaining the embodiments of this application but cannot be construed as limitations to the embodiments of this application.

A scalable video coding (SVC) technology is used as a scalable video coding technology, uses a layered coding structure, and can achieve scalability in three dimensions, that is, time, space, and mass. That is, each dimension has a basic layer and a plurality of enhancement layers. The technology enables a video source to be encoded into an SVC video stream containing a plurality of sub-streams. Different combinations of time enhancement layers and space enhancement layers correspond to different sub-streams, and each sub-stream can decode a video.

Figure 1:
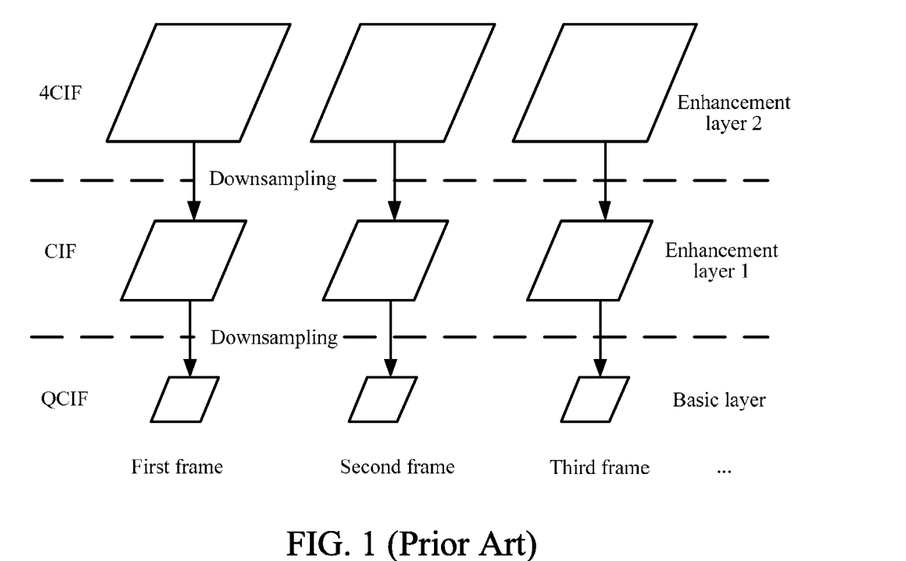
FIG. 1 is a schematic diagram of a process of performing spatial scalability processing based on SVC according to an embodiment of this application.

When a video stream performs spatial scalability processing based on SVC, different frames of the video stream can be encoded with different resolutions. As shown in FIG. 1, a first layer to a third layer can be respectively encoded into pictures in QCIF, CIF, and 4CIF formats for different frames of a video. A bitstream with three spatial resolutions may be obtained after encoding. A sending terminal may select video streams with different spatial resolutions according to a broadband. When receiving many enhancement layers, a receiving terminal decodes a video sequence with a high resolution; when receiving few enhancement layers, the receiving terminal decodes a video sequence with a low resolution.

It can be known according to an implementation principle of the SVC technology, the receiving terminal selects different bitstreams according to a current network bandwidth. This means that when broadband resources of a plurality of consecutive moments have a large difference, resolutions corresponding to bitstreams are different or even non-stop jump. Such a manner of completely relying on broadband resources for display brings poor visual experience to a user.

In the embodiments of this application, to avoid a problem such as picture transmission delay, a picture is processed into a video sequence, and a plurality of pictures in the video sequence is encoded. In the embodiments of this application, picture resolutions can be set and transmitted according to needs.

Figure 2:
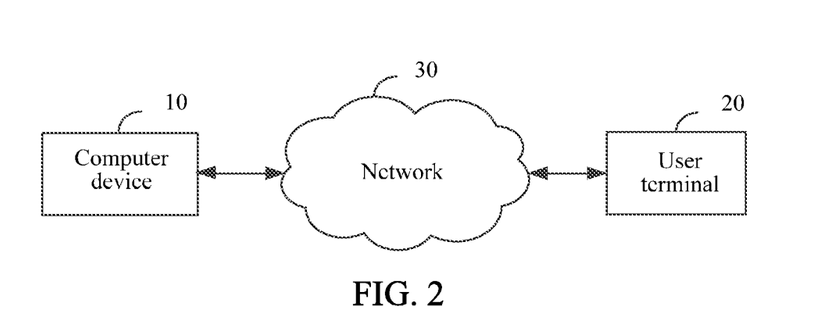
FIG. 2 is a schematic diagram of an implementation environment of a picture transmission method and receiving method according to an embodiment of this application.

FIG. 2 is a schematic diagram of an implementation environment of a picture transmission method and receiving method according to an embodiment of this application. A computer device 10 integrates a picture transmission apparatus or a picture receiving apparatus according to any embodiment of this application or integrates both a picture transmission apparatus and a picture receiving apparatus according to any embodiment of this application, and is configured to implement a picture transmission method and receiving method according to any embodiment of this application. The computer device 10 and a user terminal 20 are connected through a network 30, and the network 30 may be a wired network or a wireless network.

A picture transmission method and apparatus, and a picture receiving method and apparatus, and a system thereof in the embodiments of this application are described below with reference to the accompanying drawings.

Figure 3:
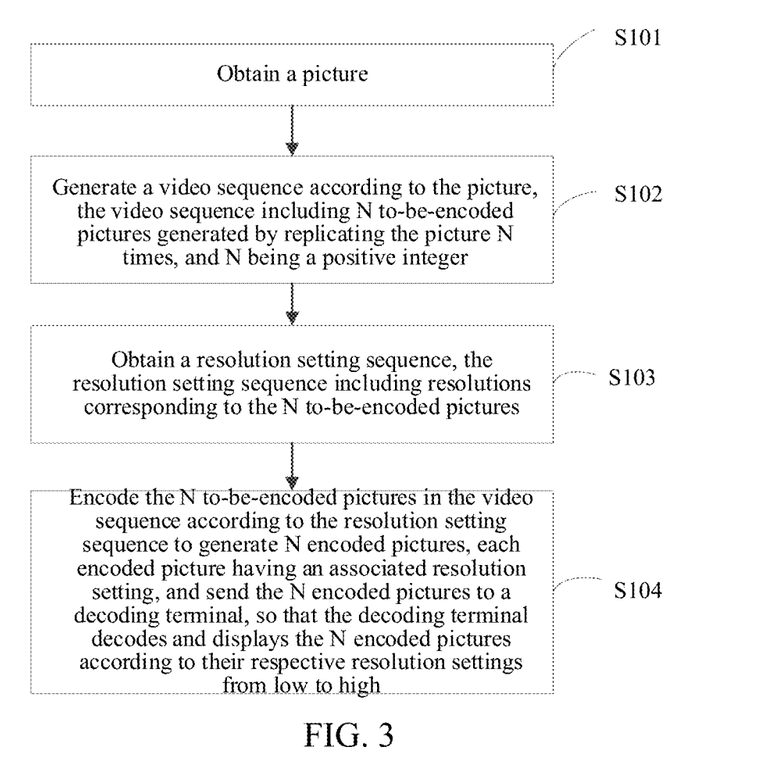
FIG. 3 is a flowchart of a picture transmission method according to an embodiment of this application.

FIG. 3 is a flowchart of a picture transmission method according to an embodiment of this application. The method is performed by the picture transmission apparatus integrated in the computer device. As shown in FIG. 3, the method includes the following operations.

S101: Obtain a picture.

It may be understood that the picture in this embodiment of this application may be a picture to be loaded in a web page, a picture to be sent in social software, or the like. That is, the picture may be any picture to be transmitted and presented and is not limited herein.

It should be noted that the picture may be obtained in different manners according to different specific application scenarios. In a possible implementation, whether a picture sending trigger function is called is monitored by a hook function. Once it is detected that the function is called, a related picture is obtained.

In another possible implementation, when a currently running progress is recognized, if a file format of a to-be-transmitted file is recognized as "jpg", "bmp", and the like, it is determined that the to-be-transmitted file is a picture, so that a related picture is obtained.

S102: Generate a video sequence according to the picture, the video sequence including N to-be-encoded pictures generated by replicating the picture N times, and N being a positive integer.

Specifically, the video sequence is generated according to the picture, and a single picture is expanded into a video stream. The video sequence includes the N to-be-encoded pictures generated by replicating the picture N times. Therefore, the copied N to-be-encoded pictures may be treated as different frames of a video stream, and to-be-processed information is converted from a picture format into a video stream format, to facilitate a subsequent resolution setting operation.

N may be set according to specific application requirements.

S103: Obtain a resolution setting sequence, the resolution setting sequence including resolutions corresponding to the N to-be-encoded pictures.

S104: Encode the N to-be-encoded pictures in the video sequence according to the resolution setting sequence to generate N encoded pictures, each encoded picture having an associated resolution setting, and send the N encoded pictures to a decoding terminal, so that the decoding terminal decodes and displays the N encoded pictures according to their respective resolution settings from low to high.

Specifically, after the video sequence is generated according to the picture, the resolution setting sequence is obtained. The resolution setting sequence includes the resolutions corresponding to the N to-be-encoded pictures, to change a resolution of each picture in the video sequence. Further, the N to-be-encoded pictures are separately encoded according to a resolution corresponding to each picture to generate N encoded pictures, and the N encoded pictures are sent to the decoding terminal, so that the decoding terminal decodes and displays the encoded picture.

It should be noted that different manners may be used according to different specific application scenarios. The N to-be-encoded pictures in the video sequence are encoded according to the resolution setting sequence, to generate the N encoded pictures:

In a first example, an $i^{th}$ to-be-encoded picture is encoded to generate an $i^{th}$ encoded picture, and the $i^{th}$ encoded picture is used as an $i^{th}$ reference picture to encode an $(i+1)^{th}$ to-be-encoded picture to generate an $(i+1)^{th}$ encoded picture, i being a positive integer less than N. Hence, prediction is performed according to a frame appearing last time, reducing delay of picture transmission.

In this example, a first frame is a frame I, and only intra-frame encoding is used. Other frames are all frames P, and intra-frame encoding or inter-frame coding may be used. The frames P may use a technology of a plurality of reference frames according to an encoder capability. That is, an encoding block in a frame P may refer to a plurality of encoded frames before the frame. If a current frame P is a full-resolution picture, and a referred frame is a downsampled picture, upsampling is performed on the referred frame, to be used as a reference picture of the current frame.

In a second example, each frame of picture is encoded.

Figure 4:
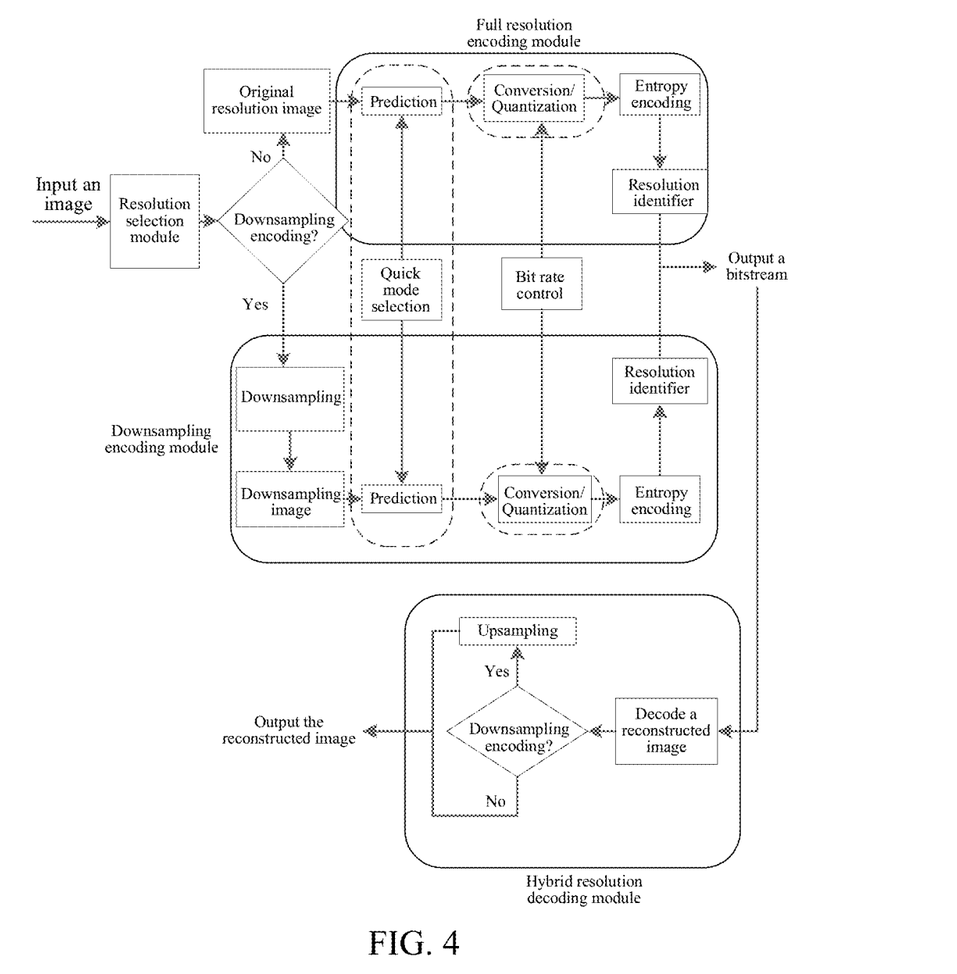
FIG. 4 is a schematic diagram of a hybrid resolution encoding framework according to an embodiment of this application.

In this example, a hybrid resolution encoding frame shown in FIG. 4 is used for encoding. Referring to FIG. 4, for each frame of picture, full resolution encoding may be performed, or downsampling may be first performed, and a downsampled picture is encoded. For an input picture, a resolution setting sequence is first queried, and whether full resolution encoding or downsampling picture encoding is performed is determined.

If full resolution encoding is performed on the current frame, a flag bit is added into a bitstream, a decoding terminal is notified that full resolution encoding is performed on the current picture, and then full resolution encoding is performed on the current picture. An encoding process is similar to an original video encoding process.

Certainly, in this example, implementation may be performed with reference to the inter-frame prediction manner shown in the first example. That is, if the current picture is an inter-frame prediction frame, whether a referred frame of the current frame has a full-resolution reconstructed picture needs to be further determined. If the referred frame of the current frame does not have a full-resolution picture, upsampling needs to be performed on the referred frame of the current frame to obtain a full-resolution picture.

If downsampling encoding is performed on the current frame, first, an original picture performs downsampling on the current frame. If a width and a height of a picture obtained by downsampling are not integral multiples of 16, extension needs to be performed. Because a solution of an encoded video picture changes, corresponding information needs to be added in a bitstream before each frame of data, and a decoder is notified that downsampling encoding is performed on the current frame.

Therefore, in this embodiment of this application, a picture is processed into a video sequence containing a plurality of pictures, so that the pictures in the video sequence are respectively processed into encoded pictures with different resolutions according to the resolution setting sequence. Therefore, a group of encoded video sequences corresponding to preset resolution sequences is obtained. Because the preset resolution sequences are calibrated according to specific application requirements, the encoded video sequences can satisfy requirements in different scenarios.

To more clearly describe a correspondence between the encoded video sequences and different scenario requirements, examples are provided below with reference to different application scenarios:

A first scenario:

In this scenario, when a bandwidth is insufficient or a picture has a large data volume, when a data transmission time is long, a low-quality picture may be first displayed, to transmit a related picture in real time. After data transmission is completed, picture quality is then improved.

Hence, in this embodiment, the resolution setting sequence is that the resolutions gradually increase according to transmission sequences of the pictures in the video sequence. That is, first to $M^{th}$ to-be-encoded pictures in the N to-be-encoded pictures correspond to downsampling resolutions, and $(M+1)^{th}$ to $N^{th}$ to-be-encoded pictures in the N to-be-encoded pictures correspond to full sampling resolutions, M being a positive integer less than N. Values of M and N may be set according to application requirements.

In this embodiment, the N to-be-encoded pictures respectively correspond to frame numbers; a quantization parameter corresponding to each to-be-encoded picture is obtained. Quantization parameters corresponding to the first to $M^{th}$ to-be-encoded pictures gradually decrease, and quantization parameters corresponding to the $(M+1)^{th}$ to $N^{th}$ to-be-encoded pictures gradually decrease. The quantization parameter is used for measuring an encoding degree, that is, a degree of loyalty to the original picture. A higher quantization parameter indicates a larger difference between an encoded picture and the original picture in aspects of a quantity of sampling points, sampling intervals, and the like. Hence, when the N to-be-encoded pictures in the video sequence are encoded according to the resolution setting sequence and the quantization parameter corresponding to each to-be-encoded picture, to generate the N encoded pictures, resolutions of first to $M^{th}$ encoded pictures corresponding to the downsampling resolutions gradually increase, and resolutions of the $(M+1)^{th}$ to $N^{th}$ encoded pictures corresponding to the full sampling resolutions are generally higher than those of the first to $M^{th}$ to-be-encoded pictures, and the resolutions also gradually increase. Therefore, a technical effect that image quality gradually improves is presented when the decoding terminal loads the N encoded pictures.

It should be noted that in this embodiment, to further ensure that resolutions of pictures of a video frame gradually increase in sequence, a difference between the quantization parameter of the $(M+1)^{th}$ to-be-encoded picture and a preset quantization parameter threshold is less than the quantization parameter of the $M^{th}$ to-be-encoded picture.

A preset quantization parameter threshold may be calibrated according to a large amount of experiment data. In an embodiment of this application, the preset quantization parameter threshold may be 6.

That is, if a last frame is a downsampled picture, and a next frame is a full-resolution picture, it needs to be ensured that a difference between a quantization parameter of the next frame and the preset quantization parameter threshold is less than a quantization parameter of the last frame. Therefore, possible quantization parameters and resolutions are shown in Table 1 below.

TABLE 1

| | Frame number | | | | |
|---|---|---|---|---|---|
| | 0 | 1 | 2 | 3 | 4 |
| Resolution | Down-sampling | Down-sampling | Full resolution | Full resolution | Full resolution |
| Quantization parameter | 34 | 28 | 30 | 26 | 20 |

To make a person skilled in the art more clear about the picture transmission method in the first scenario, descriptions are made below by way of example.

Figure 5:
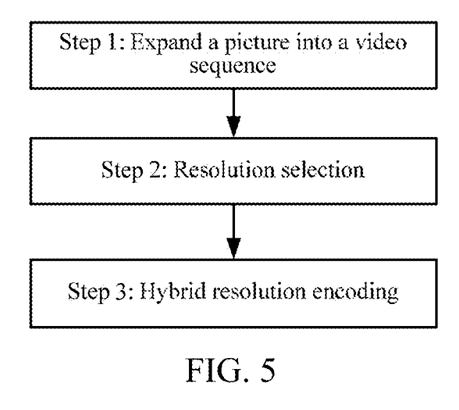
FIG. 5 is a flowchart of a picture transmission method according to an embodiment of this application.

In an example of this application, the picture transmission method may include three steps shown in FIG. 5. In a first step, a picture is expanded into a video sequence. A picture is repeated for n times and is expanded into a video sequence containing n frames. Each frame of the video sequence is the same and is a to-be-encoded picture.

Further, in a second step, some frames are selected, and downsampling encoding is performed on the frames, that is, downsampling is performed on first M frames of a video after expansion, where M may be equal to 0 or an integer less than N. In a third step, hybrid resolution encoding is performed. Hybrid resolution encoding is performed on the video sequence according to a resolution selection policy determined in the second step.

Certainly, in this scenario, to avoid transmission delay of the picture, the N to-be-encoded pictures may be encoded by using a fixed quantization parameter, reducing a data volume of the picture and ensuring real-time transmission of the picture.

A second scenario:

In this scenario, the user may have a requirement of changing the picture from clearly displayed into vaguely displayed. For example, when a sent picture is a scenery picture, to indicate that weather corresponding to a current scenery changes from sunny to cloudy, a corresponding picture is gradually vaguely displayed, to render change of the weather.

Hence, in this embodiment, the resolution setting sequence is that the resolutions gradually decrease according to transmission sequences of the pictures in the video sequence. That is, first to $M^{th}$ to-be-encoded pictures in the N to-be-encoded pictures correspond to full sampling resolutions, and $(M+1)^{th}$ to $N^{th}$ to-be-encoded pictures in the N to-be-encoded pictures correspond to downsampling resolutions, M being a positive integer less than N. Values of M and N may be set according to application requirements.

In this embodiment, the N to-be-encoded pictures respectively correspond to frame numbers; a quantization parameter corresponding to each to-be-encoded picture is obtained. Quantization parameters corresponding to the first to $M^{th}$ to-be-encoded pictures gradually increase, and quantization parameters corresponding to the $(M+1)^{th}$ to $N^{th}$ to-be-encoded pictures gradually increase. The N to-be-encoded pictures in the video sequence are encoded according to the resolution setting sequence and the quantization parameter corresponding to each to-be-encoded picture, to generate the N encoded pictures.

Therefore, in the encoded video sequence, the first to $N^{th}$ encoded pictures become less loyal to the original picture, to create a visual effect of gradually becoming vague.

A third scenario:

In this scenario, the user may have a requirement of changing the picture from clearly displayed into vaguely displayed, and then from vaguely displayed into clearly displayed. For example, when a sent picture is a vehicle picture, a visual effect that a vehicle enters a tunnel from outside, and then travels out of the tunnel may be indicated.

Hence, in this embodiment, the first to $M1^{th}$ to-be-encoded pictures in the N to-be-encoded pictures correspond to downsampling resolutions, $(M1+1)^{th}$ to $M2^{th}$ to-be-encoded pictures in the N to-be-encoded pictures correspond to downsampling resolutions (the downsampling resolutions herein are lower than the downsampling resolutions corresponding to the first to $M1^{t}$ to-be-encoded pictures), and $M2^{th}$ to $N^{th}$ to-be-encoded pictures in the N to-be-encoded pictures corresponding to full sampling resolutions, M1 and M2 being positive integers less than N. Values of M1, M2, and N may be set according to application requirements.

In this embodiment, the N to-be-encoded pictures respectively correspond to frame numbers; a quantization parameter corresponding to each to-be-encoded picture is obtained. Quantization parameters corresponding to the first to $M1^{th}$ to-be-encoded pictures gradually increase, quantization parameters corresponding to the $(M+1)^{th}$ to $M2^{th}$ to-be-encoded pictures gradually increase, and quantization parameters corresponding to the $M2^{th}$ to $N^{th}$ to-be-encoded pictures gradually decrease. The N to-be-encoded pictures in the video sequence are encoded according to the resolution setting sequence and the quantization parameter corresponding to each to-be-encoded picture, to generate the N encoded pictures.

A fourth scenario:

In this scenario, the user may have a requirement of changing the picture from vaguely displayed into clearly displayed, and then from clearly displayed into vaguely displayed. For example, when a sent picture is a fish picture, a visual effect that fish rises to a surface of water from a bottom and then dives into the bottom may be indicated.

Hence, in this embodiment, the first to $M1^{th}$ to-be-encoded pictures in the N to-be-encoded pictures correspond to downsampling resolutions, $(M+1)^{th}$ to $M2^{th}$ to-be-encoded pictures in the N to-be-encoded pictures correspond to full sampling resolutions (the downsampling resolutions herein are lower than the downsampling resolutions corresponding to the first to $M1^{th}$ to-be-encoded pictures), and $M2^{th}$ to $N^{th}$ to-be-encoded pictures in the N to-be-encoded pictures corresponding to downsampling resolutions, M1 and M2 being positive integers less than N. Values of M1, M2, and N may be set according to application requirements.

In this embodiment, the N to-be-encoded pictures respectively correspond to frame numbers; a quantization parameter corresponding to each to-be-encoded picture is obtained. Quantization parameters corresponding to the first to $M1^{th}$ to-be-encoded pictures gradually decrease, quantization parameters corresponding to the $(M+1)^{th}$ to $M2^{th}$ to-be-encoded pictures gradually increase, and quantization parameters corresponding to the $M2^{th}$ to $N^{th}$ to-be-encoded pictures gradually decrease. The N to-be-encoded pictures in the video sequence are encoded according to the resolution setting sequence and the quantization parameter corresponding to each to-be-encoded picture, to generate the N encoded pictures.

Based on applications of the foregoing scenarios, it should be noted that during actual application, regardless of in which combination manner the resolution setting sequence is set, fluency of picture transmission should be ensured. For example, a to-be-encoded picture may be a high-definition picture, and a data volume of the picture is large. Even if the picture is encoded, some encoded pictures may be large enough to cause transmission stutter. Therefore, to improve transmission efficiency, in an embodiment of this application, a coding rate is determined according to a size of a specific data volume of the to-be-encoded picture.

Specifically, in an embodiment of this application, data volume information of the picture is obtained, and corresponding bit rate limit information is generated according to the data volume information of the picture. The bit rate limit information may be set according to a network speed, and is used for limiting a size of the encoded picture and indicating an encoding degree of the picture. For example, if the bit rate limit information is 2M, sizes of all encoded pictures are not greater than 2M.

Further, the N to-be-encoded pictures in the video sequence are encoded according to the resolution setting sequence and the bit rate limit information to generate the N encoded pictures.

In the foregoing embodiment, the data volume information of the picture may be data volume information of one picture of the to-be-encoded pictures or may be data volume information of all to-be-encoded pictures included in the whole video sequence. This depends on specific content of data volume information of the used picture in a correspondence between the preset bit rate limit information and the data volume information of the picture.

For example, if in the correspondence between the preset bit rate limit information and the data volume information of the picture, each picture is greater than 2 Megabits (2M), the bit rate limit information is 1. Therefore, the data volume information of the picture, that is, a data volume of a picture, is obtained. For example, if in the correspondence between the preset bit rate limit information and the data volume information of the picture, a picture in the video sequence is greater than 20 Megabits (20M), the bit rate limit information is 2. Therefore, the data volume information of the picture, that is, data volumes of all pictures, is obtained.

Therefore, in the picture transmission method according to this embodiment of this application, the picture is processed into a video sequence, and thus, a corresponding resolution setting sequence is set according to a specific application scenario, to satisfy different scenario requirements, breaking a format limitation of the picture and providing a novel picture transmission manner.

In conclusion, in the picture transmission method according to this embodiment of this application, the picture is obtained, the video sequence is generated according to the picture, the resolution setting sequence is obtained, the N to-be-encoded pictures in the video sequence are encoded according to the resolution setting sequence, to generate the N encoded pictures, and the N encoded pictures are sent to the decoding terminal, so that the decoding terminal decodes and displays the encoded pictures. Therefore, a processing manner of the picture is expanded, so that the picture can be combined and displayed with different resolutions according to requirements.

To more comprehensively describe the picture transmission method according to this embodiment of this application, descriptions are made below mainly on a decoding side.

Figure 6:
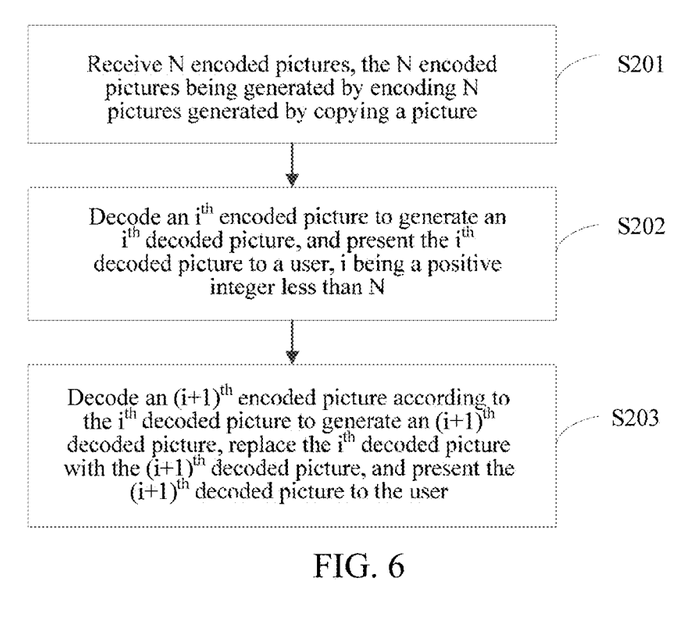
FIG. 6 is a flowchart of a picture receiving method according to an embodiment of this application.

FIG. 6 is a flowchart of a picture receiving method according to an embodiment of this application. The method may be performed by the picture receiving apparatus integrated in the computer device. As shown in FIG. 6, the method includes the following operations:

S201: Receive N encoded pictures, the N encoded pictures being N encoded pictures generated by copying and encoding a picture. That is, the N encoded pictures are generated by encoding N pictures generated by copying a picture.

Specifically, the N encoded pictures are generated by encoding N pictures generated by copying a to-be-transmitted picture. Data volumes of the N encoded pictures are lower than that of an original picture.

S202: Decode an $i^{th}$ encoded picture to generate an $i^{th}$ decoded picture, and present the $i^{th}$ decoded picture to a user, i being a positive integer less than N.

It may be understood that when each picture is encoded, a flag bit representing an encoding manner thereof is added, so that when the $i^{th}$ encoded picture is decoded, an encoding manner of the $i^{th}$ picture is learned according to the corresponding flag bit, to perform decoding in the encoding manner to generate the $i^{th}$ decoded picture and present the $i^{th}$ decoded picture to the user.

S203: Decode an $(i+1)^{th}$ encoded picture according to the $i^{th}$ decoded picture to generate an $(i+1)^{th}$ decoded picture, replace the $i^{th}$ decoded picture with the $(i+1)^{th}$ decoded picture, and present the $(i+1)^{th}$ decoded picture to the user.

Specifically, in this embodiment, because the $i^{th}$ decoded picture and the $(i+1)^{th}$ encoded picture are all obtained based on the original picture, that is, the $i^{th}$ decoded picture is strongly related to the $(i+1)^{th}$ encoded picture, the $(i+1)^{th}$ encoded picture may be decoded based on the $i^{th}$ decoded picture to generate the $(i+1)^{th}$ decoded picture, so that decoding efficiency is greatly improved.

Hence, in this embodiment, when a client views a picture, each time one frame of video data is received, decoding may be performed. During decoding, current frame resolution information is first read, and then a reconstructed picture is obtained by decoding. If the current frame is a downsampled picture, upsampling display needs to be performed. If the current frame is a full-resolution picture, the reconstructed picture is directly output.

Figure 7A:
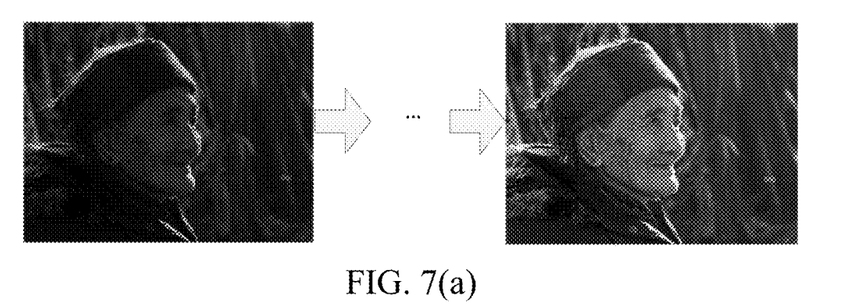
FIG. 7(a) is a schematic diagram of a picture display effect according to an embodiment of this application.

Therefore, after a client receives and decodes a new frame of data, a new frame of decoded and reconstructed picture is displayed. If video encoding quantization parameters decrease frame by frame, decoding is shown in FIG. 7(*a*), and obtained picture quality increases frame by frame. Therefore, a progressive picture display function may be implemented at the client.

Figure 7B:
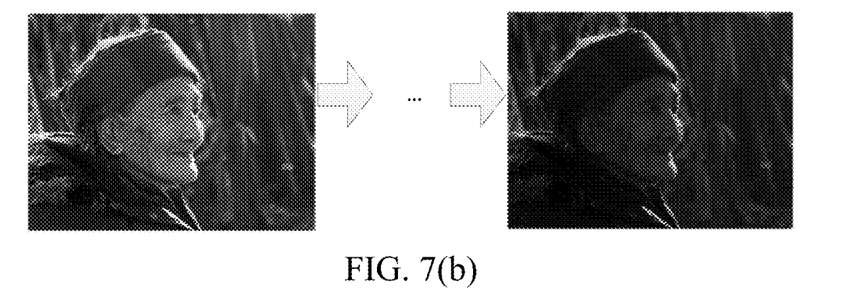
FIG. 7(b) is a schematic diagram of a picture display effect according to another embodiment of this application.

If video encoding quantization parameters increase frame by frame, decoding is shown in FIG. 7(*b*), and obtained picture quality decreases frame by frame. Therefore, a progressive picture darkening function may be implemented at the client.

In conclusion, in the picture receiving method according to this embodiment of this application, N encoded pictures are received, the N encoded pictures being N encoded pictures generated by copying and encoding a picture; an $i^{th}$ encoded picture is decoded to generate an $i^{th}$ decoded picture, and the $i^{th}$ decoded picture is presented to a user; and an $(i+1)^{th}$ encoded picture is decoded according to the $i^{th}$ decoded picture to generate an $(i+1)^{th}$ decoded picture, and the $i^{th}$ decoded picture is replaced with the $(i+1)^{th}$ decoded picture. Therefore, a plurality of encoded pictures is decoded, to display the picture with combinations of different resolutions, satisfy requirements of corresponding scenarios and improving user experience.

Figure 8:
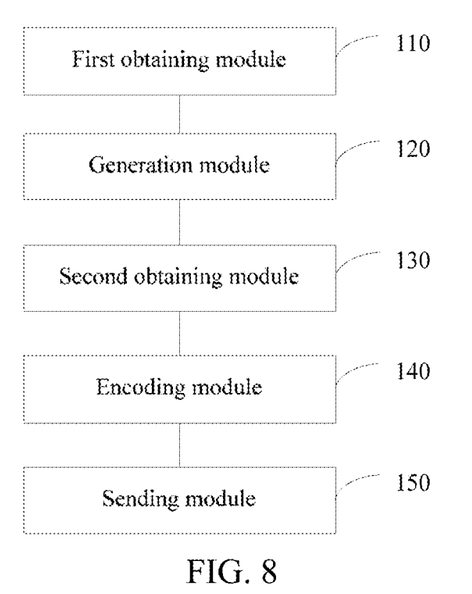
FIG. 8 is a schematic structural diagram of a picture transmission apparatus according to an embodiment of this application.

To implement the foregoing embodiments, an embodiment of this application further provides a picture transmission apparatus. FIG. 8 is a schematic structural diagram of a picture transmission apparatus according to an embodiment of this application. As shown in FIG. 8, the apparatus includes: a first obtaining module 110, a generation module 120, a second obtaining module 130, an encoding module 140, and a sending module 150.

The first obtaining module 110 is configured to obtain a picture.

The generation module 120 is configured to generate a video sequence according to the picture, the video sequence including N to-be-encoded pictures generated by replicating the picture N times, and N being a positive integer.

The second obtaining module 130 is configured to obtain a resolution setting sequence, the resolution setting sequence including resolutions corresponding to the N to-be-encoded pictures.

The encoding module 140 is configured to encode the N to-be-encoded pictures in the video sequence according to the resolution setting sequence to generate N encoded pictures, each encoded picture having an associated resolution setting.

Figure 9:
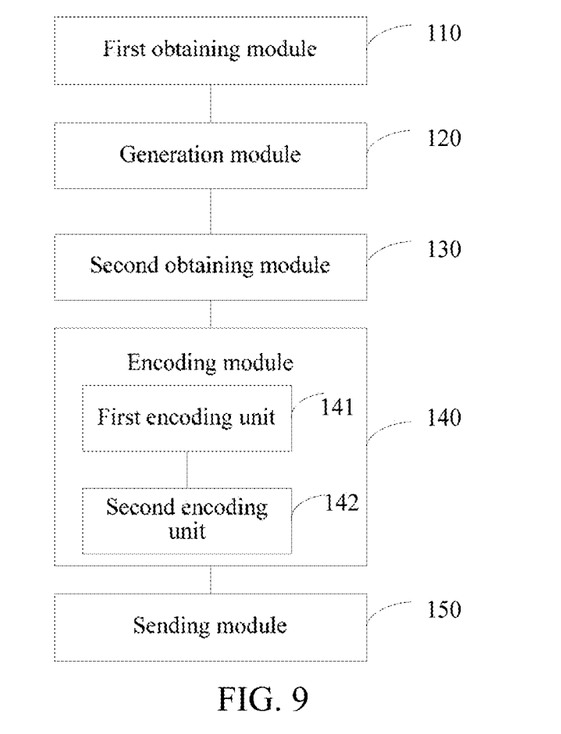
FIG. 9 is a schematic structural diagram of a picture transmission apparatus according to another embodiment of this application.

In an embodiment of this application, it can be known according to a schematic structural diagram of a picture transmission apparatus according to another embodiment of this application shown in FIG. 9 that the encoding module 140 includes a first encoding unit 141 and a second encoding unit 142.

The first encoding unit 141 is configured to encode an $i^{th}$ to-be-encoded picture to generate an $i^{th}$ encoded picture.

The second encoding unit 142 is configured to use the $i^{th}$ encoded picture as an $i^{th}$ reference picture to encode an $(i+1)^{th}$ to-be-encoded picture to generate an $(i+1)^{th}$ encoded picture, i being a positive integer less than N.

The sending module 150 is configured to send the N encoded pictures to a decoding terminal, so that the decoding terminal decodes and displays the N encoded pictures according to their respective resolution settings from low to high.

It should be noted that the foregoing explanations and descriptions for the picture transmission method embodiment are also applied to the picture transmission apparatus in this embodiment, and an implementation principle thereof is similar and is not described herein again.

In conclusion, in the picture transmission apparatus according to this embodiment of this application, the picture is obtained, the video sequence is generated according to the picture, the resolution setting sequence is obtained, the N to-be-encoded pictures in the video sequence are encoded according to the resolution setting sequence, to generate the N encoded pictures, and the N encoded pictures are sent to the decoding terminal, so that the decoding terminal decodes and displays the N encoded pictures. Therefore, a processing manner of the picture is expanded, so that the picture can be combined and displayed with different resolutions according to requirements.

Figure 10:
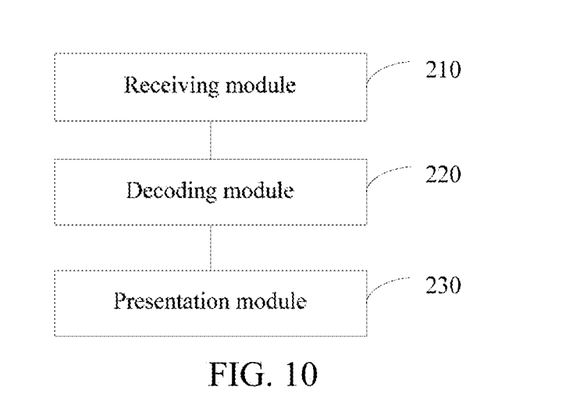
FIG. 10 is a schematic structural diagram of a picture receiving apparatus according to an embodiment of this application.

To implement the foregoing embodiment, an embodiment of this application further provides a picture receiving apparatus. FIG. 10 is a schematic structural diagram of a picture receiving apparatus according to an embodiment of this application. As shown in FIG. 10, the apparatus includes a receiving module 210, a decoding module 220, and a presentation module 230.

The receiving module 210 is configured to receive N encoded pictures, the N encoded pictures being generated by encoding N pictures generated by copying a picture The decoding module 220 is configured to decode an $i^{th}$ encoded picture to generate an $i^{th}$ decoded picture.

The presentation module 230 is configured to present the $i^{th}$ decoded picture to a user, i being a positive integer less than N.

In an embodiment of this application, the decoding module 220 is further configured to decode an $(i+1)^{th}$ encoded picture according to the $i^{th}$ decoded picture to generate an $(i+1)^{th}$ decoded picture, replace the $i^{th}$ decoded picture with the $(i+1)^{th}$ decoded picture, and present the $(i+1)^{th}$ decoded picture to the user.

It should be noted that the foregoing explanations and descriptions for the picture receiving method embodiment are also applied to the picture receiving apparatus in this embodiment, and an implementation principle thereof is similar and is not described herein again.

In conclusion, in the picture receiving apparatus according to this embodiment of this application, N encoded pictures are received, the N encoded pictures being N encoded pictures generated by copying and encoding a picture; an $i^{th}$ encoded picture is decoded to generate an $i^{th}$ decoded picture, and the $i^{th}$ decoded picture is presented to a user; and an $(i+1)^{th}$ encoded picture is decoded according to the $i^{th}$ decoded picture to generate an $(i+1)^{th}$ decoded picture, and the $i^{th}$ decoded picture is replaced with the $(i+1)^{th}$ decoded picture. Therefore, a plurality of encoded pictures is decoded, to display the picture with combinations of different resolutions, satisfy requirements of corresponding scenarios and improving user experience.

Figure 11:
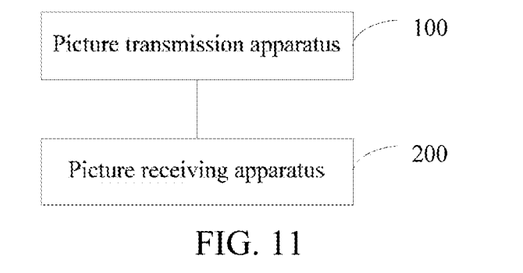
FIG. 11 is a schematic structural diagram of a picture processing system according to an embodiment of this application.

To implement the foregoing embodiments, an embodiment of this application further provides a picture processing system. FIG. 11 is a schematic structural diagram of a picture processing system according to an embodiment of this application. As shown in FIG. 11, the picture processing system includes a picture transmission apparatus 100 and a picture receiving apparatus 200.

Explanations and descriptions for the picture transmission apparatus 100 correspond to the foregoing described picture transmission apparatus. Explanations and descriptions for the picture receiving apparatus 200 correspond to the foregoing described picture receiving apparatus. Details are not described herein again.

To clearly describe the picture processing system according to this embodiment, descriptions are made below with reference to a working process of the picture processing system in an application scenario.

Figure 12:
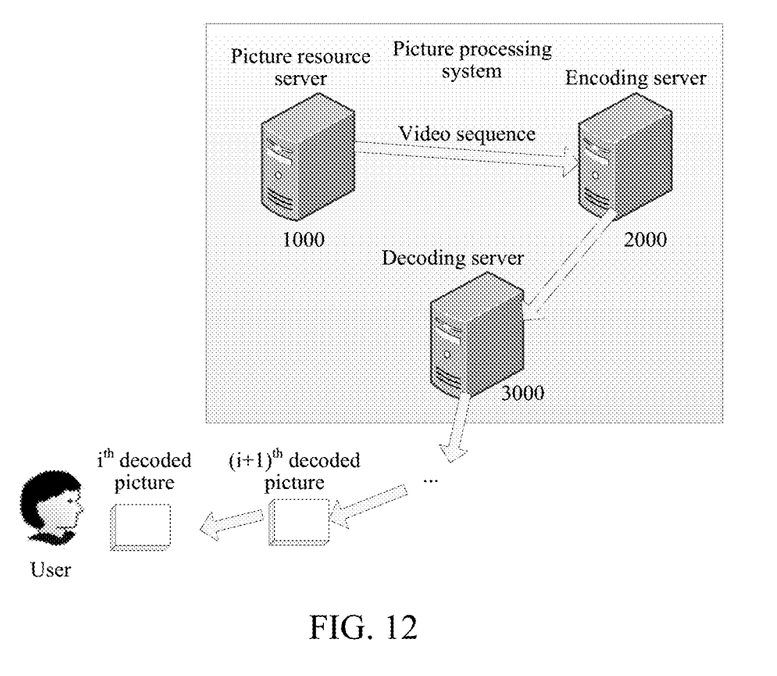
FIG. 12 is a schematic structural diagram of a picture processing system according to an embodiment of this application.

As shown in FIG. 12, the picture processing system includes a picture resource server 1000, an encoding server 2000, and a decoding server 3000.

The picture resource server 1000 is configured to store information about an obtained picture and copy the picture into a plurality, to generate a video sequence including a plurality of pictures.

The encoding server 2000 stores a resolution setting sequence and is configured to encode the N to-be-encoded pictures in the video sequence according to the resolution setting sequence to generate N encoded pictures; and send the N encoded pictures to a decoding terminal.

The decoding server 3000 is configured to receive N encoded pictures; decode an $i^{th}$ encoded picture to generate an $i^{th}$ decoded picture, and present the $i^{th}$ decoded picture to a user, i being a positive integer less than N; and decode an $(i+1)^{th}$ encoded picture according to the $i^{th}$ decoded picture to generate an $(i+1)^{th}$ decoded picture, and replace the $i^{th}$ decoded picture with the $(i+1)^{th}$ decoded picture.

In conclusion, in the picture processing system according to this embodiment of this application, a picture is obtained; a video sequence is generated according to the picture; a resolution setting sequence is obtained; the N to-be-encoded pictures in the video sequence are encoded according to the resolution setting sequence to generate N encoded pictures, and the N encoded pictures are sent to a decoding terminal, so that the decoding terminal receives the N encoded pictures; an $i^{th}$ encoded picture is decoded to generate an $i^{th}$ decoded picture, and the $i^{th}$ decoded picture is presented to a user; and an $(i+1)^{th}$ encoded picture is decoded according to the $i^{th}$ decoded picture to generate an $(i+1)^{th}$ decoded picture, the $i^{th}$ decoded picture is replaced with the $(i+1)^{th}$ decoded picture. Therefore, a processing manner of the picture is expanded, so that the picture can be combined and displayed with different resolutions according to requirements.

Figure 13:
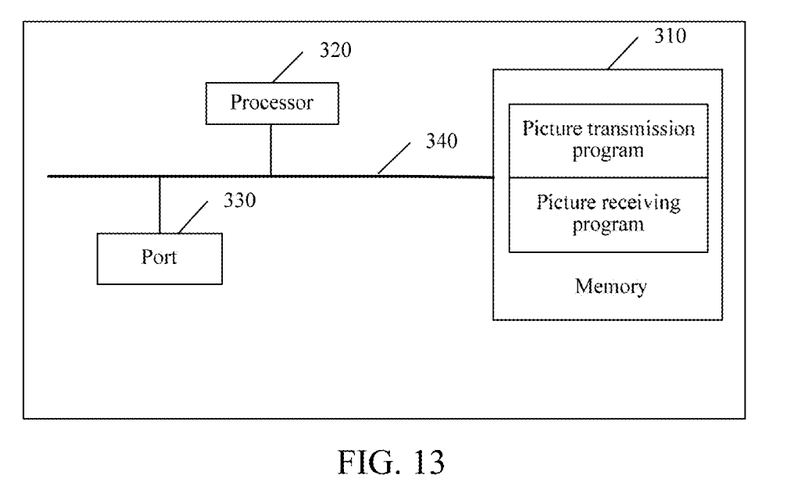
FIG. 13 is a schematic structural diagram of a computer device according to an embodiment of this application.

To implement the foregoing embodiments, an embodiment of this application further provides a computer device. FIG. 13 is a schematic structural diagram of a computer device according to an embodiment of this application. As shown in FIG. 13, the computer device includes a memory 310, a processor 320, a port 330 configured to send and receive data, and a bus 340 connecting these components. The memory 310 may be a non-volatile or a non-temporary memory and stores a computer program that may be run on the processor 320, that is, machine-readable instructions, such as a picture transmission program for implementing the picture transmission method and a picture receiving program for implementing the picture receiving method. The processor 320 implements the picture transmission method and receiving method described in the foregoing embodiments when executing the program.

To implement the foregoing embodiments, an embodiment of this application further provides a non-transitory computer-readable storage medium, storing a computer program thereon, the program implementing the picture transmission method described in the foregoing embodiments when being executed by the processor.

To implement the foregoing embodiments, this application further provides a non-temporary computer-readable storage medium, storing a computer program thereon, the program implementing the picture receiving method described in the foregoing embodiments when being executed by the processor.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In the present specification, schematic expressions for the foregoing terms are not necessarily specific to the same embodiment or example. In addition, the described specific features, structures, materials, or features can be combined in a proper manner in any one or more embodiments or examples. In addition, in the case of no mutual contradiction, a person skilled in the art can join and combine different embodiments or examples described in the present specification and features of different embodiments or examples.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In description of the embodiments of this application, "multiple" means at least two, such as two and three unless it is specifically defined otherwise.

Any process or method description described in a flowchart or in another manner can be understood as a module, segment, or part representing codes including one or more executable instructions for implementing specific logical functions or steps of a process. In addition, a range of preferred implementations of the present disclosure include another implementation, and functions can be executed not according to the shown or discussed sequence, including according to a basically simultaneous manner according to involved functions or an opposite sequence, which should be understood by a person skilled in the art of the embodiments of the present invention.

Logics and/or steps represented in a flowchart or described in another manner can be regarded as, for example, a sequencing list of executable instructions for implementing logical functions, and can be specifically implemented in any computer readable medium, for an instruction execution system, apparatus, or device (such as a computer-based system, a system including a processor, or another system that can take and execute instructions from an instruction execution system, apparatus, or device) to use or use by combining these instruction execution systems, apparatuses, or devices. In the present specification, "a computer readable medium" may be any apparatus that may include, store, communicate with, propagate, or transmit programs for an instruction execution system, apparatus, or device to use or use by combining these instruction execution systems, apparatuses, or devices. A specific example (a non-greedy list) of the computer readable medium includes the following: an electric connection portion (an electronic apparatus) including one or more wirings, a portable computer enclosure (a magnetic apparatus), a random access memory (RAM), a read-only memory (ROM), an erasable programmable read-only memory (EPROM or flash memory), a fiber apparatus, and a portable optical disc read-only memory (CDROM). In addition, the computer readable medium may even print papers of the program or other media thereon because the program can be obtained in an electronic manner by, for example, performing optical scanning on papers or other media and then performing edition and interpretation or processing in another proper manner if necessary and then is stored in a computer memory.

It should be understood that parts of the embodiments of this application can be implemented by hardware, software, firmware, or a combination thereof. In the foregoing implementation, multiple steps or methods may be implemented by software or firmware that is stored in a memory and that is executed by a proper instruction system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

A person skilled in the art may understand that implementation of all or some of steps carried in the foregoing embodiment method is completed by instructing relevant hardware by a program. The program may be stored in a computer readable storage medium. When being executed, the program includes one or a combination of steps of the method embodiment.

In addition, functional units in the embodiments of the present invention may be integrated in a processing module or may separately physical exist in units, or two or more units are integrated in one module. The integrated module may be implemented in a form of hardware, or may be implemented in a form of a software functional module. If implemented in the form of software functional modules and sold or used as an independent product, the integrated modules may also be stored in a computer-readable storage medium.

The aforementioned storage medium may be a read-only memory, a magnetic disk or an optical disc. Although the embodiments of this application are shown and described in the above, it can be understood that the foregoing embodiments are exemplary and cannot be construed as a limitation to this application. A person of ordinary skill in the art can change, modify, replace, and deform the foregoing embodiments within the scope of the embodiments of this application.

What is claimed is:

1. A picture transmission method, applied to a computer device having one or more processors and memory storing programs to be executed by the one or more processors and the method comprising the following steps:
   obtaining a picture;
   generating a video sequence according to the picture, the video sequence comprising N to-be-encoded pictures generated by replicating the picture N times, and N being a positive integer;
   obtaining a resolution setting sequence, the resolution setting sequence comprising resolutions corresponding to the N to-be-encoded pictures;
   obtaining a quantization parameter corresponding to each of the N to-be-encoded pictures, quantization parameters corresponding to the first to $M^{th}$ to-be-encoded pictures gradually decreasing, and quantization parameters corresponding to the $(M+1)^{th}$ to $N^{th}$ to-be-encoded pictures gradually decreasing; and
   encoding the N to-be-encoded pictures in the video sequence according to the resolution setting sequence and the quantization parameters corresponding to the N to-be-encoded pictures to generate N encoded pictures, each encoded picture having an associated resolution setting and quantization parameter, and sending the N encoded pictures to a decoding computer device,
   wherein the decoding computer device decodes and displays the N encoded pictures according to their respective resolution settings from low to high and corresponding quantization parameters.

2. The picture transmission method according to claim 1, wherein first to $M^{th}$ to-be-encoded pictures in the N to-be-encoded pictures correspond to downsampling resolutions, and $(M+1)^{th}$ to $N^{th}$ to-be-encoded pictures in the N to-be-encoded pictures correspond to full sampling resolutions, M being a positive integer less than N.

3. The picture transmission method according to claim 1, wherein a difference between the quantization parameter of the $(M+1)^{th}$ to-be-encoded picture and a preset quantization parameter threshold is less than the quantization parameter of the $M^{th}$ to-be-encoded picture.

4. The picture transmission method according to claim 1, wherein the encoding the N to-be-encoded pictures in the video sequence according to the resolution setting sequence to generate N encoded pictures comprises:
   encoding an $i^{th}$ to-be-encoded picture to generate an $i^{th}$ encoded picture using intra-frame encoding; and
   using the $i^{th}$ encoded picture as an $i^{th}$ reference picture to encode an $(i+1)^{th}$ to-be-encoded picture to generate an $(i+1)^{th}$ encoded picture using inter-frame encoding, i being a positive integer less than N.

5. The picture transmission method according to claim 1, further comprising:
   obtaining data volume information of the picture;
   generating corresponding bit rate limit information according to the data volume information of the picture; and
   the encoding the N to-be-encoded pictures in the video sequence according to the resolution setting sequence to generate N encoded pictures comprises:
   encoding the N to-be-encoded pictures in the video sequence according to the resolution setting sequence and the bit rate limit information to generate the N encoded pictures.

6. A computer device comprising one or more processors, memory coupled to the one or more processors and a plurality of programs stored in the memory that, when executed by the one or more processors, cause the computer device to perform a plurality of operations comprising:
   obtaining a picture;
   generating a video sequence according to the picture, the video sequence comprising N to-be-encoded pictures generated by replicating the picture N times, and N being a positive integer;
   obtaining a resolution setting sequence, the resolution setting sequence comprising resolutions corresponding to the N to-be-encoded pictures;
   obtaining a quantization parameter corresponding to each of the N to-be-encoded pictures, quantization parameters corresponding to the first to $M^{th}$ to-be-encoded pictures gradually decreasing, and quantization parameters corresponding to the $(M+1)^{th}$ to $N^{th}$ to-be-encoded pictures gradually decreasing; and
   encoding the N to-be-encoded pictures in the video sequence according to the resolution setting sequence and the quantization parameters corresponding to the N to-be-encoded pictures to generate N encoded pictures, each encoded picture having an associated resolution setting and quantization parameter, and sending the N encoded pictures to a decoding computer device,
   wherein the decoding computer device decodes and displays the N encoded pictures according to their respective resolution settings from low to high and corresponding quantization parameters.

7. The computer device according to claim 6, wherein first to $M^{th}$ to-be-encoded pictures in the N to-be-encoded pictures correspond to downsampling resolutions, and $(M+1)^{th}$ to $N^{th}$ to-be-encoded pictures in the N to-be-encoded pictures correspond to full sampling resolutions, M being a positive integer less than N.

8. The computer device according to claim 6, wherein a difference between the quantization parameter of the $(M+1)^{th}$ to-be-encoded picture and a preset quantization parameter threshold is less than the quantization parameter of the $M^{th}$ to-be-encoded picture.

9. The computer device according to claim 6, wherein the encoding the N to-be-encoded pictures in the video sequence according to the resolution setting sequence to generate N encoded pictures comprises:
   encoding an $i^{th}$ to-be-encoded picture to generate an $i^{th}$ encoded picture using intra-frame encoding; and
   using the $i^{th}$ encoded picture as an $i^{th}$ reference picture to encode an $(i+1)^{th}$ to-be-encoded picture to generate an $(i+1)^{th}$ encoded picture using inter-frame encoding, i being a positive integer less than N.

10. The computer device according to claim 6, wherein the plurality of operations further comprise:
    obtaining data volume information of the picture;
    generating corresponding bit rate limit information according to the data volume information of the picture; and
    the encoding the N to-be-encoded pictures in the video sequence according to the resolution setting sequence to generate N encoded pictures comprises:
    encoding the N to-be-encoded pictures in the video sequence according to the resolution setting sequence and the bit rate limit information to generate the N encoded pictures.

11. A non-transitory computer readable storage medium storing a plurality of machine readable instructions in connection with a computer device having one or more processors, wherein the plurality of machine readable instructions, when executed by the one or more processors, cause the computer device to perform a plurality of operations including:
    obtaining a picture;
    generating a video sequence according to the picture, the video sequence comprising N to-be-encoded pictures generated by replicating the picture N times, and N being a positive integer;
    obtaining a resolution setting sequence, the resolution setting sequence comprising resolutions corresponding to the N to-be-encoded pictures;
    obtaining a quantization parameter corresponding to each of the N to-be-encoded pictures, quantization parameters corresponding to the first to $M^{th}$ to-be-encoded pictures gradually decreasing, and quantization parameters corresponding to the $(M+1)^{th}$ to $N^{th}$ to-be-encoded pictures gradually decreasing; and
    encoding the N to-be-encoded pictures in the video sequence according to the resolution setting sequence and the quantization parameters corresponding to the N to-be-encoded pictures to generate N encoded pictures, each encoded picture having an associated resolution setting and quantization parameter, and sending the N encoded pictures to a decoding computer device,
    wherein the decoding computer device decodes and displays the N encoded pictures according to their respective resolution settings from low to high and corresponding quantization parameters.

12. The non-transitory computer readable storage medium according to claim 11, wherein first to $M^{th}$ to-be-encoded pictures in the N to-be-encoded pictures correspond to downsampling resolutions, and $(M+1)^{th}$ to $N^{th}$ to-be-encoded pictures in the N to-be-encoded pictures correspond to full sampling resolutions, M being a positive integer less than N.

13. The non-transitory computer readable storage medium according to claim 12, wherein a difference between the quantization parameter of the $(M+1)^{th}$ to-be-encoded picture and a preset quantization parameter threshold is less than the quantization parameter of the $M^{th}$ to-be-encoded picture.

14. The non-transitory computer readable storage medium according to claim 11, wherein the encoding the N to-be-encoded pictures in the video sequence according to the resolution setting sequence to generate N encoded pictures comprises:
    encoding an $i^{th}$ to-be-encoded picture to generate an $i^{th}$ encoded picture using intra-frame encoding; and
    using the $i^{th}$ encoded picture as an $i^{th}$ reference picture to encode an $(i+1)^{th}$ to-be-encoded picture to generate an $(i+1)^{th}$ encoded picture using inter-frame encoding, i being a positive integer less than N.

15. The non-transitory computer readable storage medium according to claim 11, wherein the plurality of operations further comprise:
    obtaining data volume information of the picture;
    generating corresponding bit rate limit information according to the data volume information of the picture; and
    the encoding the N to-be-encoded pictures in the video sequence according to the resolution setting sequence to generate N encoded pictures comprises:
    encoding the N to-be-encoded pictures in the video sequence according to the resolution setting sequence and the bit rate limit information to generate the N encoded pictures.

* * * * *